United States Patent
Yamada

(10) Patent No.: US 8,368,961 B2
(45) Date of Patent: Feb. 5, 2013

(54) IMAGE PROCESSING DEVICE AND METHOD FOR CREATING BINARY IMAGE DATA USING A SINGLE SET OF DITHER MATRICES

(75) Inventor: Ryuji Yamada, Ogaki (JP)

(73) Assignee: Brother Kogyo Kabushiki Kaisha, Aich-ken (JP)

( * ) Notice: Subject to any disclaimer, the term of this patent is extended or adjusted under 35 U.S.C. 154(b) by 595 days.

(21) Appl. No.: 12/683,674

(22) Filed: Jan. 7, 2010

(65) Prior Publication Data

US 2010/0182621 A1 Jul. 22, 2010

(30) Foreign Application Priority Data

Jan. 22, 2009 (JP) ................................. 2009-012043

(51) Int. Cl.
 *H04N 1/405* (2006.01)
(52) U.S. Cl. ...... 358/3.13; 358/1.9; 358/3.14; 358/3.16; 358/3.19
(58) Field of Classification Search .................. None
 See application file for complete search history.

(56) References Cited

U.S. PATENT DOCUMENTS

| | | | |
|---|---|---|---|
| 3,742,129 A | 6/1973 | Roberts et al. | |
| 4,924,301 A * | 5/1990 | Surbrook | 358/534 |
| 5,040,080 A | 8/1991 | Scholten | |
| 5,291,296 A | 3/1994 | Hains | |
| 5,541,736 A | 7/1996 | Sagara et al. | |
| 5,701,366 A | 12/1997 | Ostromoukhov et al. | |
| 6,714,320 B1 * | 3/2004 | Nakahara et al. | 358/3.13 |

(Continued)

FOREIGN PATENT DOCUMENTS

| | | |
|---|---|---|
| EP | 0 427 380 B1 | 5/1991 |
| EP | 0 959 615 A2 | 11/1999 |

(Continued)

OTHER PUBLICATIONS

Japanese Official Action dated Jan. 18, 2011 with English translation from Japanese Application JP 2009-012043.

(Continued)

*Primary Examiner* — Dung Tran
(74) *Attorney, Agent, or Firm* — Scully, Scott, Murphy & Presser, PC

(57) ABSTRACT

An image processing device includes a storing unit and a creating unit. The storing unit stores a single set of line dither matrices. The single set of line dither matrices includes a first line dither matrix for first color, a second line dither matrix for second color, and a third line dither matrix for third color. Each of the first line dither matrix, the second line dither matrix, and the third line dither matrix includes threshold values that are arranged to make halftone dots grow linearly and including a plurality of n×n sub-matrices. N is set to an integer greater than 1. The first dither matrix has a first screen angle. The second dither matrix has a second screen angle that is different from the first screen angle. The third dither matrix has a third screen angle that is different from the first screen angle and the second screen angle. The creating unit is configured to create binary image data based on input image data using the single set of line dither matrices. A difference between the first screen angle and the second screen angle is set to either one of ($\pi/2-\arctan(1/n)$) radians and ($\pi/2+\arctan(1/n)$) radians. A difference between the first screen angle and the third screen angle is set to either one of ($\pi/2-\arctan(1/n)$) radians and ($\pi/2+\arctan(1/n)$) radians.

7 Claims, 8 Drawing Sheets

U.S. PATENT DOCUMENTS

| | | | |
|---|---|---|---|
| 6,879,416 B2 | 4/2005 | Shimizu | |
| 6,972,871 B2 * | 12/2005 | Tsuda et al. | 358/1.9 |
| 7,643,179 B2 * | 1/2010 | Yasutomi | 358/3.2 |
| 7,684,736 B2 | 3/2010 | Sugizaki | |
| 8,270,049 B2 * | 9/2012 | McElvain | 358/515 |
| 2001/0013941 A1 * | 8/2001 | Ogiyama et al. | 358/1.9 |
| 2001/0055129 A1 | 12/2001 | Shimizu | |
| 2002/0085249 A1 | 7/2002 | Tsuda et al. | |
| 2005/0002048 A1 * | 1/2005 | Takahashi et al. | 358/1.9 |
| 2005/0012945 A1 | 1/2005 | Richer | |
| 2005/0206930 A1 | 9/2005 | Tonami | |
| 2006/0066910 A1 | 3/2006 | Yasutomi | |
| 2007/0103730 A1 | 5/2007 | Yasutomi | |
| 2008/0213681 A1 | 9/2008 | Sugizaki | |
| 2009/0296122 A1 * | 12/2009 | Broddin et al. | 358/1.9 |

FOREIGN PATENT DOCUMENTS

| | | |
|---|---|---|
| EP | 0 748 109 B1 | 6/2001 |
| EP | 1 494 458 A1 | 1/2005 |
| JP | H10-108022 | 4/1998 |
| JP | 2000-85187 | 3/2000 |
| JP | 2002-16814 | 1/2002 |
| JP | 2002-112047 | 4/2002 |
| JP | 2002-118746 | 4/2002 |
| JP | 2005-027109 | 1/2005 |
| JP | 2006-101264 | 4/2006 |
| JP | 2006-292796 | 10/2006 |
| JP | 2006-311488 | 11/2006 |

OTHER PUBLICATIONS

Extended European Search Report dated Feb. 15, 2011 of corresponding European Application 10150311.8.

Extended European Search Report dated Feb. 23, 2011 of corresponding European Application 10150311.8.

Official Action dated Oct. 25, 2011 received from the European Patent Office in related application 10 150 311.9-1522.

Official Action dated Oct. 25, 2011 received from the European Patent Office in related application 10 150 311.8-1522.

* cited by examiner

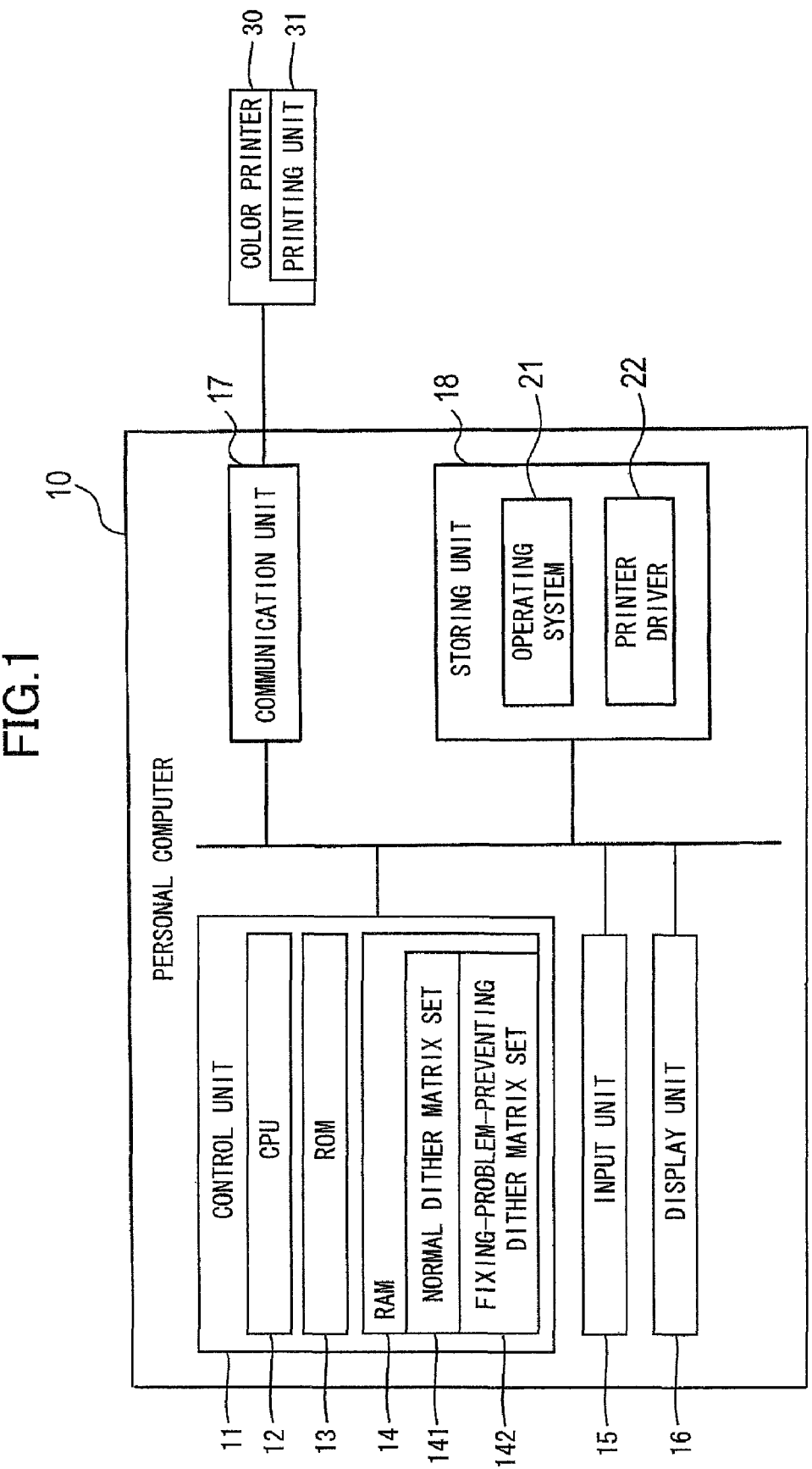

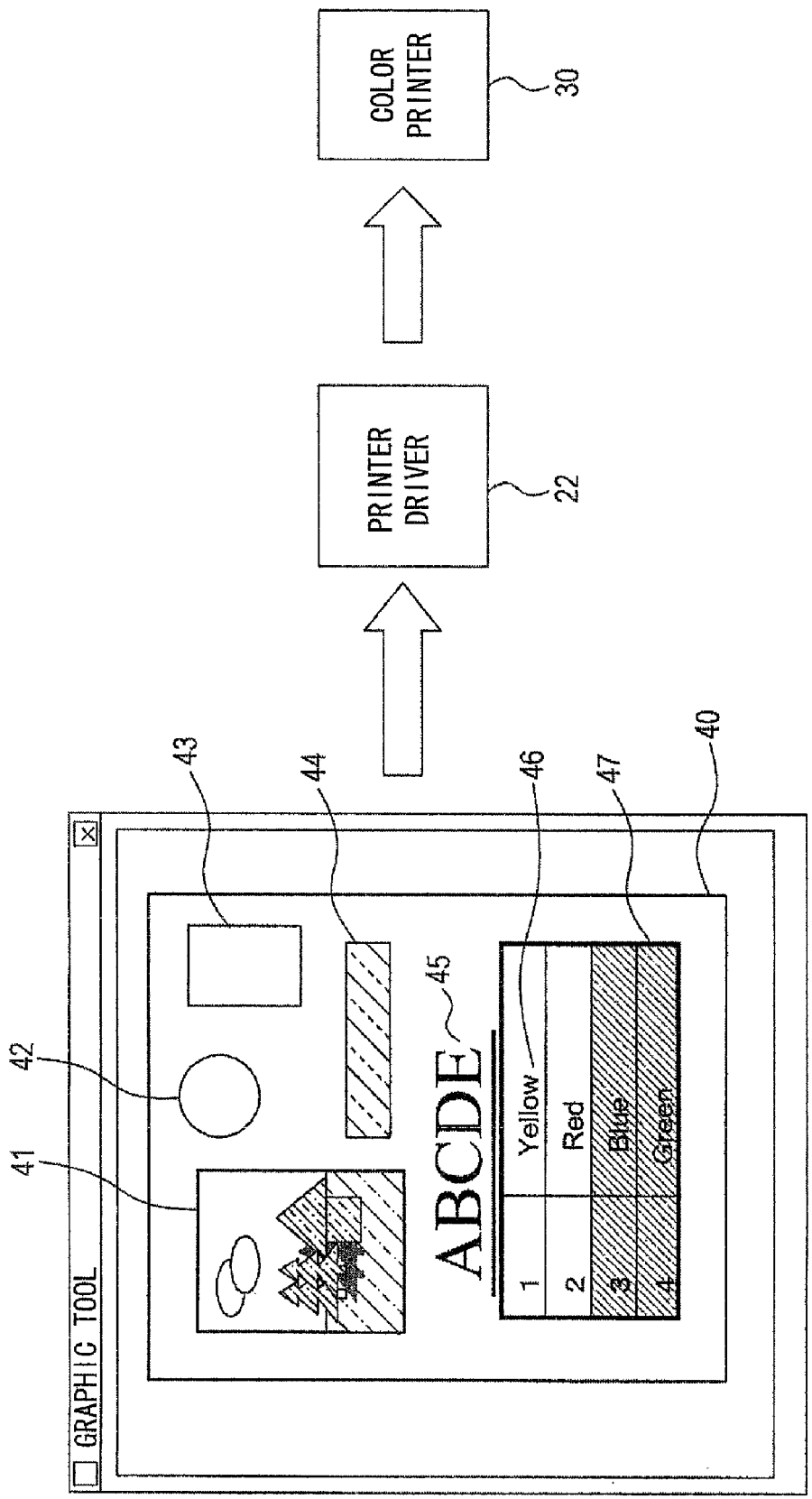

FIG.3(a)  FIG.3(b)
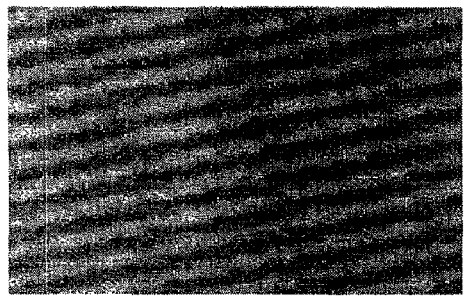 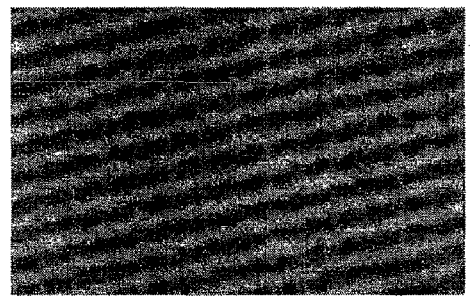
FIG.3(c)  FIG.3(d)
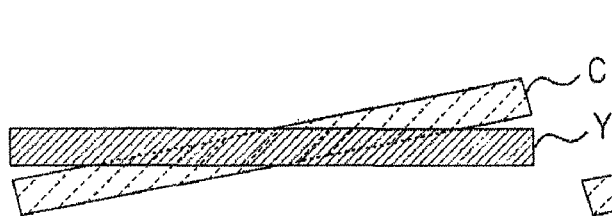 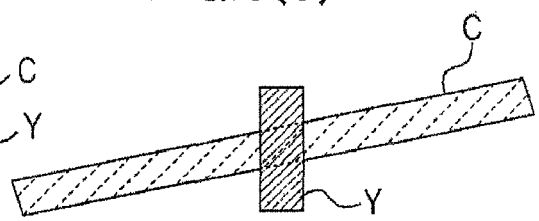
FIG.4
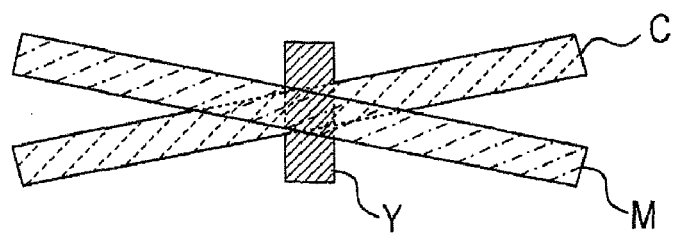

FIG.5(a)
FIG.5(b)
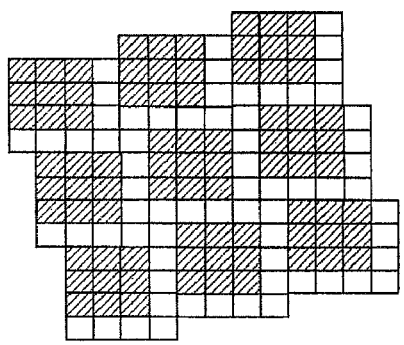
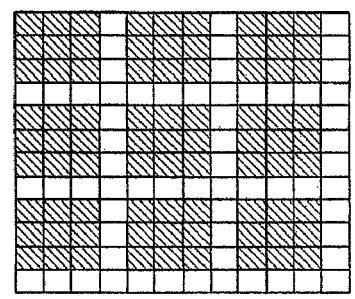
FIG.5(c)
FIG.5(d)
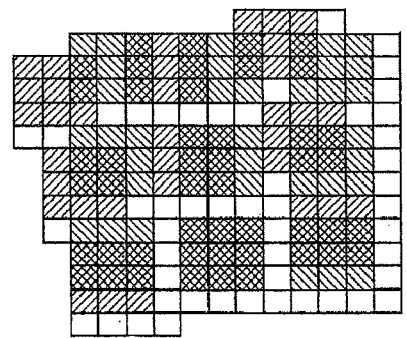
FIG.5(e)

FIG.6(a)
| | | | | | | | | | 1 | 2 | 3 | 4 | | | | |
|---|---|---|---|---|---|---|---|---|---|---|---|---|---|---|---|---|
| | | | | 1 | 2 | 3 | 4 | 5 | 6 | 7 | 8 | | | | | |
| 1 | 2 | 3 | 4 | 5 | 6 | 7 | 8 | 9 |10 |11 |12 | | | | | |
| 5 | 6 | 7 | 8 | 9 |10 |11 |12 |13 |14 |15 |16 |17 | | | | |
| 9 |10 |11 |12 |13 |14 |15 |16 |17 | 1 | 2 | 3 | 4 | | | | |
|13 |14 |15 |16 |17 | 1 | 2 | 3 | 4 | 5 | 6 | 7 | 8 | | | | |
| | | | 1 | 2 | 3 | 4 | 5 | 6 | 7 | 8 | 9 |10 |11 |12 | | |
| | | | 5 | 6 | 7 | 8 | 9 |10 |11 |12 |13 |14 |15 |16 |17 | |
| | | | 9 |10 |11 |12 |13 |14 |15 |16 |17 | 1 | 2 | 3 | 4 | |
| | | |13 |14 |15 |16 |17 | 1 | 2 | 3 | 4 | 5 | 6 | 7 | 8 | |
| | | | | | | 1 | 2 | 3 | 4 | 5 | 6 | 7 | 8 | 9 |10 |11 |12 |
| | | | | | | 5 | 6 | 7 | 8 | 9 |10 |11 |12 |13 |14 |15 |16 |17 |
| | | | | | | 9 |10 |11 |12 |13 |14 |15 |16 |17 | | | |
| | | | | | |13 |14 |15 |16 |17 | | | | | | |
FIG.6(b)
| 1 | 5 | 9 |13 | 1 | 5 | 9 |13 | 1 | 5 | 9 |13 |
|---|---|---|---|---|---|---|---|---|---|---|---|
| 2 | 6 |10 |14 | 2 | 6 |10 |14 | 2 | 6 |10 |14 |
| 3 | 7 |11 |15 | 3 | 7 |11 |15 | 3 | 7 |11 |15 |
| 4 | 8 |12 |16 | 4 | 8 |12 |16 | 4 | 8 |12 |16 |
| 1 | 5 | 9 |13 | 1 | 5 | 9 |13 | 1 | 5 | 9 |13 |
| 2 | 6 |10 |14 | 2 | 6 |10 |14 | 2 | 6 |10 |14 |
| 3 | 7 |11 |15 | 3 | 7 |11 |15 | 3 | 7 |11 |15 |
| 4 | 8 |12 |16 | 4 | 8 |12 |16 | 4 | 8 |12 |16 |
| 1 | 5 | 9 |13 | 1 | 5 | 9 |13 | 1 | 5 | 9 |13 |
| 2 | 6 |10 |14 | 2 | 6 |10 |14 | 2 | 6 |10 |14 |
| 3 | 7 |11 |15 | 3 | 7 |11 |15 | 3 | 7 |11 |15 |
| 4 | 8 |12 |16 | 4 | 8 |12 |16 | 4 | 8 |12 |16 |
FIG.6(c)
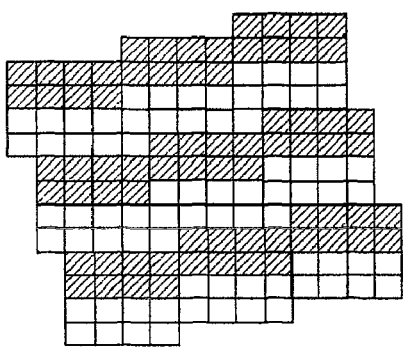
FIG.6(d)
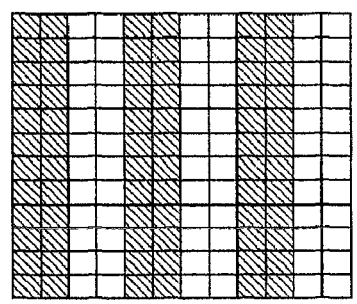
FIG.6(e)
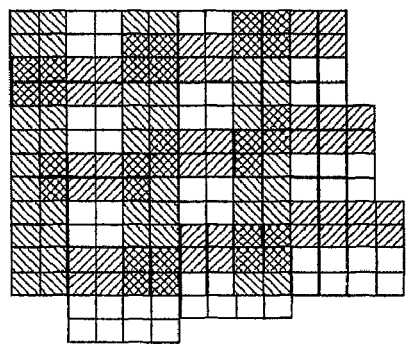

IMAGE PROCESSING DEVICE AND METHOD FOR CREATING BINARY IMAGE DATA USING A SINGLE SET OF DITHER MATRICES

CROSS REFERENCE TO RELATED APPLICATION

This application claims priority from Japanese Patent Application No. 2009-012043 filed Jan. 22, 2009. The entire content of the priority application is incorporated herein by reference.

TECHNICAL FIELD

The present invention relates to an image processing device.

BACKGROUND

Dithering is a common method of obtaining binary image data for printing by first converting multi-value image data expressing the image to be printed (image data in the RGB color space with a possible 256 gradations for each color, for example) to multi-value image data in a color space corresponding to the colors of toner used in the printer (the CMYK color space, for example), and subsequently converting this multi-value image data to binary data. With the dithering method, binary image data is obtained by referencing dither matrices in the form of conversion tables specifying threshold values for each dot in the image.

Some conventional dithering methods have employed a dot-centralized matrix for spreading a halftone comprising a plurality of adjacent dots clustered within a sub-matrix around a certain point. In order to prevent the occurrence of bands called moiré patterns caused by dots being repeated in regular cycles, the plurality of sub-matrices arranged within the dither matrix are offset from each other so that any straight line passing through halftone dots in the dither matrix forms an angle with the horizontal. However, while this technique can prevent the production of moiré patterns, the technique cannot resolve fixing problems caused by toner scattering, which occurs when specific colors of toner are superposed.

More specifically, this phenomenon called toner scattering can occur when attempting to fix specific colors of toner that have been superposed, because components of the toner may cause different colors of toner to repel each other, resulting in spreading or blurring in the fixed image. Such toner scattering occurs when attempting to superpose and fix cyan or magenta toner with yellow toner, for example, because the negatively charged cyan and magenta toner cannot be properly superposed over the yellow toner due to the electrostatic effect of a component in the yellow toner. Such fixing problems are particularly noticeable in an image when portions of the image having a prescribed size are filled with a single color formed by combining the specific colors of toner that cause fixing problems (such as yellow and cyan).

The conventional technology described above is incapable of preventing fixing problems that occur when combining the specific colors of toner. While one approach to preventing such fixing problems would be to chemically analyze components in the toner, such analysis would not only involve a considerable amount of time and expense, but would also not be guaranteed to resolve problems associated with all color combinations.

SUMMARY

In view of the foregoing, it is an object of the invention to provide an image processing device capable of preventing fixing problems that occur when combining specific colors of toner.

In order to attain the above and other objects, the invention provides an image processing device including a storing unit and a creating unit. The storing unit stores a single set of line dither matrices. The single set of line dither matrices includes a first line dither matrix for first color, a second line dither matrix for second color, and a third line dither matrix for third color. Each of the first line dither matrix, the second line dither matrix, and the third line dither matrix includes threshold values that are arranged to make halftone dots grow linearly and including a plurality of n×n sub-matrices. N is set to an integer greater than 1. The first dither matrix has a first screen angle. The second dither matrix has a second screen angle that is different from the first screen angle. The third dither matrix has a third screen angle that is different from the first screen angle and the second screen angle. The creating unit is configured to create binary image data based on input image data using the single set of line dither matrices. A difference between the first screen angle and the second screen angle is set to either one of ($\pi/2-\arctan(1/n)$) radians and ($\pi/2+\arctan(1/n)$) radians. A difference between the first screen angle and the third screen angle is set to either one of ($\pi/2-\arctan(1/n)$) radians and ($\pi/2+\arctan(1/n)$) radians.

According to another aspect, the present invention provides an image processing method comprising: acquiring input image data; and creating binary image data based on the input image data using a single set of line dither matrices, the single set of line dither matrices including a first line dither matrix for first color, a second line dither matrix for second color, and a third line dither matrix for third color, each of the first line dither matrix, the second line dither matrix, and the third line dither matrix including threshold values that are arranged to make halftone dots grow linearly and including a plurality of n×n sub-matrices, n being set to an integer greater than 1, the first dither matrix having a first screen angle, the second dither matrix having a second screen angle that is different from the first screen angle, the third dither matrix having a third screen angle that is different from the first screen angle and the second screen angle, a difference between the first screen angle and the second screen angle being set to either one of ($\pi/2-\arctan(1/n)$) radians and ($\pi/2+\arctan(1/n)$) radians, a difference between the first screen angle and the third screen angle being set to either one of ($\pi/2-\arctan(1/n)$) radians and ($\pi/2+\arctan(1/n)$) radians.

According to another aspect, the present invention provides a computer-readable recording medium that stores an image processing program, the image processing program comprising instructions for: acquiring input image data; and creating binary image data based on the input image data using a single set of line dither matrices, the single set of line dither matrices including a first line dither matrix for first color, a second line dither matrix for second color, and a third line dither matrix for third color, each of the first line dither matrix, the second line dither matrix, and the third line dither matrix including threshold values that are arranged to make halftone dots grow linearly and including a plurality of n×n sub-matrices, n being set to an integer greater than 1, the first dither matrix having a first screen angle, the second dither matrix having a second screen angle that is different from the first screen angle, the third dither matrix having a third screen angle that is different from the first screen angle and the second screen angle, a difference between the first screen angle and the second screen angle being set to either one of ($\pi/2$-arctan(1/n)) radians and ($\pi/2$+arctan(1/n)) radians, a difference between the first screen angle and the third screen angle being set to either one of ($\pi/2$-arctan(1/n)) radians and ($\pi/2$+arctan(1/n)) radians.

BRIEF DESCRIPTION OF THE DRAWINGS

The particular features and advantages of the invention as well as other objects will become apparent from the following description taken in connection with the accompanying drawings, in which:

FIG. 1 is a block diagram showing a color conversion device;

FIG. 2 is an explanatory diagram illustrating a method for processing object data;

FIG. 3(a) is an explanatory diagram showing a printing result when screen angles for yellow and cyan are set to 0 and 14 degrees, respectively;

FIG. 3(b) is an explanatory diagram showing a printing result when screen angles for yellow and cyan are set to 90 and 14 degrees, respectively;

FIG. 3(c) is an explanatory diagram showing line images that are formed when screen angles for yellow and cyan are set to 0 and 14 degrees, respectively;

FIG. 3(d) is an explanatory diagram showing line images that are formed when screen angles for yellow and cyan are set to 90 and 14 degrees, respectively;

FIG. 4 is an explanatory diagram showing line images that are formed when screen angles for yellow, cyan, and magenta are set to 90, 14, and 166 degrees, respectively;

FIG. 5(a) is an explanatory diagram showing a normal dither matrix for cyan having a screen angle set to arctan (¼) radians (14 degrees);

FIG. 5(b) is an explanatory diagram showing a normal dither matrix for yellow having a screen angle set to arctan ($\pi/2$) radians (90 degrees);

FIG. 5(c) is an explanatory diagram showing an image formed using the normal dither matrix for cyan shown in FIG. 5(a);

FIG. 5(d) is an explanatory diagram showing an image formed using the normal dither matrix for yellow shown in FIG. 5(b);

FIG. 5(e) is an explanatory diagram showing the image shown in FIG. 5(c) being superposed on the image shown in FIG. 5(e);

FIG. 6(a) is an explanatory diagram showing a fixing-problem-preventing dither matrix for cyan having a screen angle set to arctan (¼) radians (14 degrees);

FIG. 6(b) is an explanatory diagram showing a fixing-problem-preventing dither matrix for yellow having a screen angle set to arctan ($\pi/2$) radians (90 degrees);

FIG. 6(c) is an explanatory diagram showing an image formed using the normal dither matrix for cyan shown in FIG. 6(a);

FIG. 6(d) is an explanatory diagram showing an image formed using the normal dither matrix for yellow shown in FIG. 6(b);

FIG. 6(e) is an explanatory diagram showing the image shown in FIG. 6(c) being superposed on the image shown in FIG. 6(d);

Figures 7A, 7B, 7C, 7D:
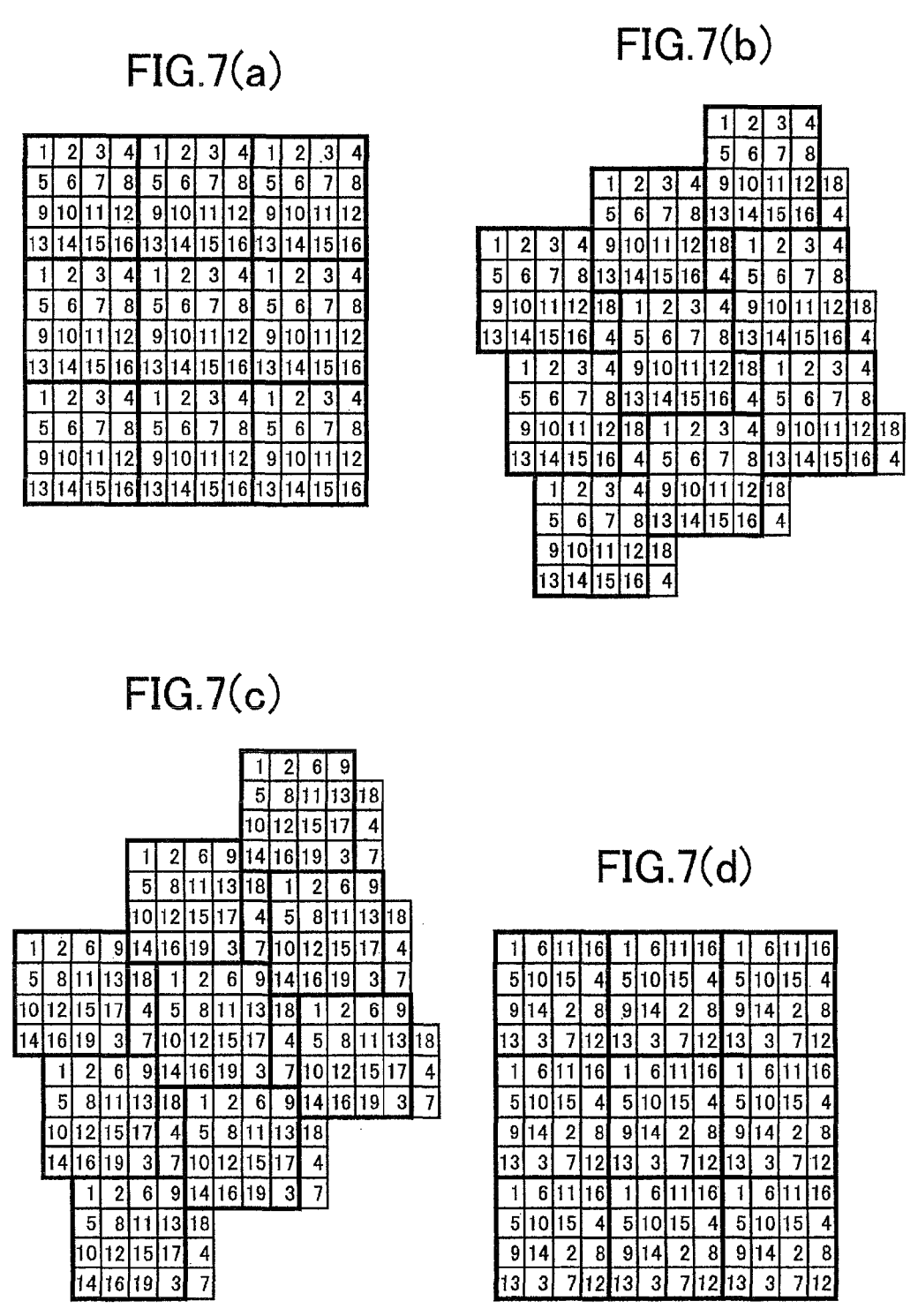

FIG. 7(a) is an explanatory diagram showing a fixing-problem-preventing dither matrix having a screen angle set to 0 radians (0 degrees);

FIG. 7(b) is an explanatory diagram showing a fixing-problem-preventing dither matrix having a screen angle set to arctan (⅔) radians;

FIG. 7(c) is an explanatory diagram showing a fixing-problem-preventing dither matrix having a screen angle set to arctan (¾) radians;

FIG. 7(d) is an explanatory diagram showing a fixing-problem-preventing dither matrix having a screen angle set to arctan ($\pi/2$) radians (90 degrees);

DETAILED DESCRIPTION

Figure 8:
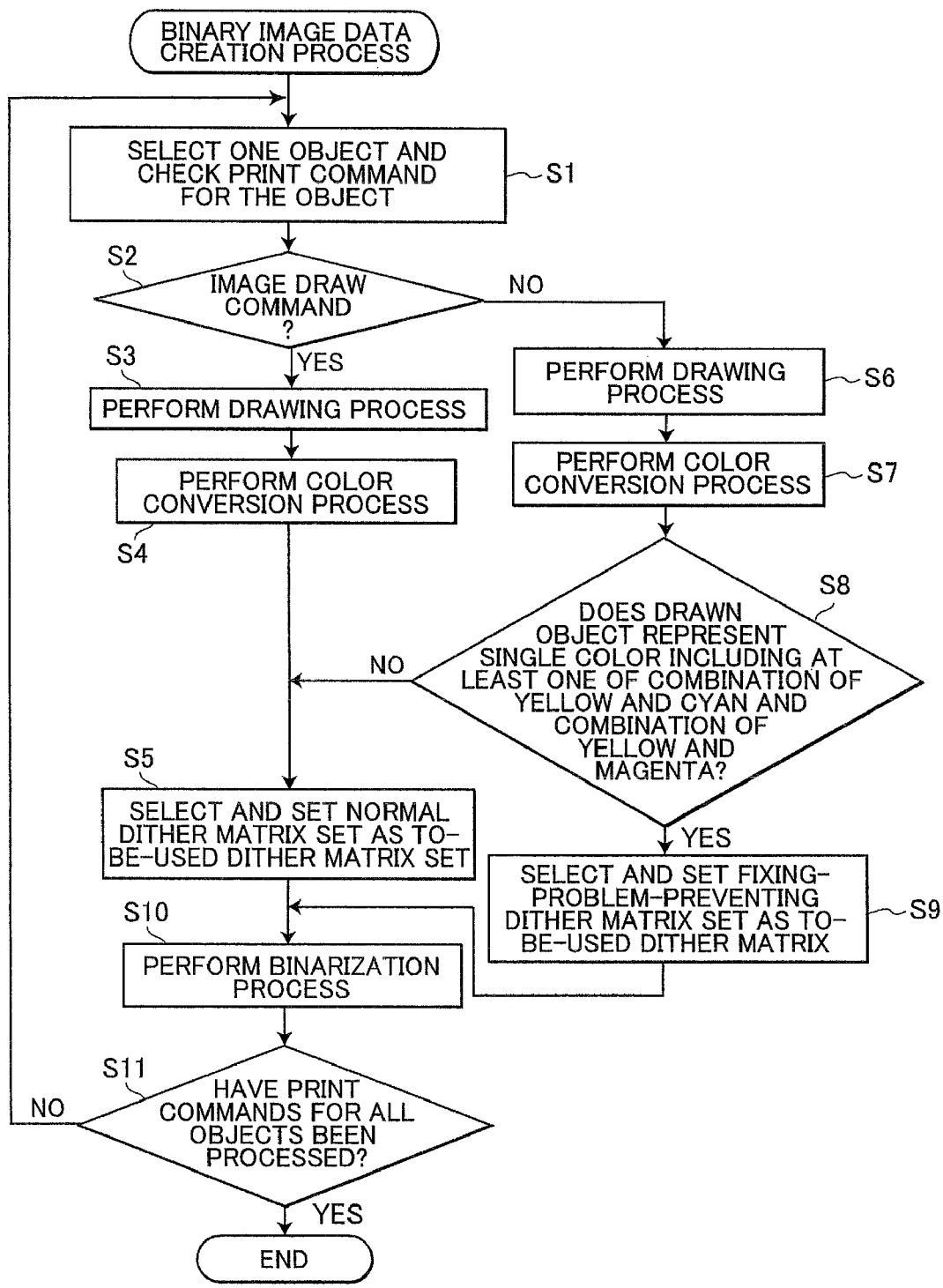
FIG. 8 is a flowchart illustrating steps of a binary image data creation process performed by the color conversion device.

An image processing device according to embodiment of the invention will be described while referring to the accompanying drawings wherein like parts and components are designated by the same reference numerals to avoid duplicating description.

As shown in FIG. 1, a personal computer 10 includes a control unit 11, an input unit 15, a display unit 16, a communication unit 17, and a storing unit 18. The control unit 11 is configured as a microcomputer and includes a CPU 12, a ROM 13, and a RAM 14. The control unit 11 controls each component of the personal computer 10. The RAM 14 stores a single set of normal dither matrices 141 (hereinafter, will be referred to "normal dither matrix set 141") and a single set of fixing-problem-preventing dither matrices 142 (hereinafter, will be referred to "fixing-problem-preventing dither matrix set 142"). The normal dither matrix set 141 and fixing-problem-preventing dither matrix set 142 are stored in the RAM 14 when a printer driver 22 described later is installed in the personal computer 10. These dither matrix set 141 and 142 will be described later.

The input unit 15 is configured to enable a user to input instructions, such as a keyboard and a pointing device (for example, mouse). The display unit 16 is configured to display color image represented by RGB values, such as a liquid crystal display. The communication unit 17 performs a data transmitting and receiving process via a network. In this embodiment, the personal computer 10 is capable of communicating with a color printer 30 via LAN (Local Area Network).

The storing unit 18 is capable of storing various data and information, such as a hard disk. An operating system 21 and a printer driver 22 are installed in the storing unit 18. The printer driver 22 is software (program) for using the color printer 30 on the personal computer 10, and executes a binary image data creation process (FIG. 8) described later.

The color printer 30 is a laser printer capable of printing a color image by using four toners of C (cyan), M (magenta), Y (yellow), and K (black). The color printer 30 includes a printing unit 31. The printing unit 31 prints a color image by superposing four color toners based on the binary image data transmitted from the printer driver 22 and fixing the four color toners. In the color printer 30, the printing unit 31 transfers four toners on a recording sheet or an intermediate transfer member in order of black, yellow, cyan, magenta.

Next, overall of binary image data creation process will be described. The printer driver 22 is launched when a print command is issued in another application being executed by the CPU 12 (a graphics tool, as shown in FIG. 2). When launched, the printer driver 22 creates binary image data for each color of toner used by the color printer 30 from image data for an image 40 that is targeted for printing (hereinafter referred to as the "target image 40") and transmits this binary image data to the color printer 30. More specifically, the printer driver 22 creates binary image data for each of the C, M, Y, and K colors by first performing a color conversion process to convert multi-value (256 gradations in the this embodiment) RGB data expressing the target image 40 to CMYK data and subsequently performs a binarization process to convert the CMYK data to binary data using a dither matrix for each of the CMYK colors.

As described above, upon receiving this binary image data from the printer driver 22, the color printer 30 prints a color image by creating a toner image for each color based on the binary image data, transferring the toner images onto paper so that the images are superposed on one another, and fixing the toner images to the surface of the paper with heat. Here, the properties of the toner may cause fixing problems when specific colors of toner are combined.

FIGS. 3(*a*)-3(*d*) will be used to illustrate how screen angle settings affect the degree of fixing problems for an example of combining yellow toner with cyan toner. In this example, it will be assumed that fixing problems occur when cyan or magenta toner is superposed over a base layer of yellow toner and that such fixing problems do not occur when combining yellow with black. FIG. 3(*a*) shows an image produced when the yellow screen angle is set to 0 degrees and the cyan screen angle is set to 15 degrees. FIG. 3(*b*) is an image produced when the yellow screen angle is set to 90 degrees and the cyan screen angle is set to 15 degrees. Here, "screen angle" is used to denote the angle formed between straight lines linking halftone dots (dot clusters) in each dither matrix described later and the horizontal.

FIG. 3(*c*) corresponds to the case of FIG. 3(*a*) when the yellow screen angle is 0 degrees (the portion shaded with solid lines) and the cyan angle is 15 degrees (the portion shaded with dotted lines). FIG. 3(*d*) corresponds to the case of FIG. 3(*b*) when the yellow screen angle is 90 degrees and the cyan angle is 15 degrees. A region in which yellow and cyan overlap is smaller in the example of FIG. 3(*d*) than in the example of FIG. 3(*c*) since the angle formed by yellow and cyan screen angles approaches 90 degrees in the example of FIG. 3(*d*). Therefore, the screen angles used in FIG. 3(*d*) can better prevent fixing problems.

FIG. 4 shows an example in which magenta is further superposed over the example in FIG. 3(*d*) at a screen angle of 165 degrees (the portion shaded with broken lines having alternating dots and dashes). With this screen angles, even if fixing problems occur when superposing yellow toner and magenta toner, such fixing problems are avoided in this case since the region of overlapping toner is minimal.

Next, the normal dither matrix set 141 and the fixing-problem-preventing dither matrix set 142 will be described specifically. The normal dither matrix set 141 has a plurality of a dot-centralized matrix that is prepared for each color and is configured of 4×4 sub-matrices, as shown in the examples of FIGS. 5(*a*) and 5(*b*). In the sub-matrices, a plurality of threshold values are allocated so that dots to be turned on based on the threshold values of each sub-matrix grow in the same order. Specifically, a threshold value within each sub-matrix is larger as the location is farther from a location to which a threshold value "1" is allocated. Each dither matrix in the normal dither matrix set 141 has a screen angle. For example, FIG. 5(*a*) shows a normal dither matrix 141 for cyan having a screen angle which is set to arctan(¼) radians (about 14 degrees). FIG. 5(*b*) shows a normal dither matrix 141 for yellow having a screen angle which is set to arctan(π/2) radians (90 degrees). Each shaded area in FIGS. 5(*c*) and 5(*d*) indicates turned-on dot formed by using the normal dither matrix set 141 when input image data having a prescribed density is inputted to the personal computer 10. Further, normal dither matrices for magenta and black have the screen angles that are set to 75 degrees and 45 degrees, respectively. In other words, the screen angle for each color is set to a suitable angle in the normal dither matrix set 141 to prevent moiré patterns. The dot-centralized normal dither matrix 141 is less likely to produce unstable moiré patterns than the fixing-problem-preventing dither matrix 142, which is a line screen type matrix.

The fixing-problem-preventing dither matrix set 142 has a plurality of line screen type matrices. Each line screen type matrix is prepared for colors and is configured of a plurality of 4×4 sub-matrices arranged therein, as shown in the examples of FIGS. 6(*a*) and 6(*b*). In the line screen type dither matrix, a plurality of threshold values are allocated so that adjacent halftone dots expand or grow linearly within each sub-matrix shown in FIGS. 6(*c*) and 6(*d*).

The dither matrices contained in the fixing-problem-preventing dither matrix set 142 is configured so that the screen angles of the cyan and magenta dither matrices are set as close as possible to the straight line orthogonal to the screen angle of the yellow dither matrix, without being aligned with this straight line. In other words, the fixing-problem-preventing dither matrix set 142 is configured so that the clockwise difference between the screen angle of the dither matrix for the yellow and the screen angle of the dither matrix for cyan or magenta is set to either one of $(\pi/2-\arctan(1/n))$ radians and $(\pi/2+\arctan(1/n))$ radians.

In this embodiment, since each dither matrix of the fixing-problem-preventing dither matrix set 142 is configured of a plurality of 4×4 sub-matrices (n=4), the screen angle for each color is limited by the number of dots in each sub-matrix. Thus, the screen angles for cyan and magenta are set closest to but not aligned with the straight line orthogonal to the yellow screen angle within this limitation.

For example, FIG. 6(*a*) shows a dither matrix for cyan contained in the fixing-problem-preventing dither matrix set 142 and having a screen angle which is set to arctan (¼) radians (about 14 degrees). FIG. 6(*b*) shows a dither matrix for yellow contained in the fixing-problem-preventing dither matrix set 142 and having a screen angle which is set to π/2 radians (90 degrees). Each shaded area in FIGS. 6(*c*) and 6(*d*) indicates dots (image) formed using the fixing-problem-preventing dither matrix set 142 when input image data having a prescribed density is inputted to the personal computer 10. When the images formed using the fixing-problem-preventing dither matrices 142 shown in FIGS. 6(*c*) and 6(*d*) are superposed as shown in FIG. 6(*e*), a first superposed area of the images in which cyan toner is superposed on the yellow toner. As shown in FIG. 5(*e*), an image to be formed based on the normal dither matrix set 141 has a second superposed area in which cyan is superposed on yellow. The first superposed area is smaller than or equal to the second superposed area. Similarly, when either one of cyan and magenta is superposed on yellow, the first superposed area is smaller than or equal to the second superposed area.

The screen angle of dither matrix will be described more specifically. Since each dither matrix of the fixing-problem-preventing dither matrix set 142 is configured of an arrangement of 4×4 sub-matrices in this embodiment, the screen angle of each fixing-problem-preventing dither matrix 142 can be set to 0, arctan(¼) radians, arctan(²⁄₄) radians, arctan(¾) radians, arctan(⁴⁄₄) radians, arctan(⁵⁄₄) radians, arctan(⁶⁄₄) radians, arctan(⁷⁄₄) radians, π/2 radians, π/2+arctan(¼) radians, π/2+arctan(²⁄₄) radians, π/2+arctan(¾) radians, π/2+arctan(⁴⁄₄) radians, π/2+arctan(⁵⁄₄) radians, π/2+arctan(⁶⁄₄)

radians, and π/2+arctan(7/4) radians. FIGS. 7(a), 7(b), 7(c), and 7(d) show examples of arrangement of threshold values that are located in a part of each dither matrix having screen angles 0, arctan(2/4), arctan(3/4), and arctan(4/4) radians, respectively. In other words, each dither matrix in the fixing-problem-preventing dither matrix set 142 is configured of an arrangement of n×n sub-matrices, most often the smallest screen angle is arctan(1/n) radians, which is the angle formed by placing each sub-matrix one dot higher vertically for every n dots laterally (where n=4 in this embodiment).

Methods of growing dots (halftones) based on threshold values in the dither matrix set a prescribed screen angles are well known in the art and will not be specifically described herein.

Further, the screen angles for cyan and magenta are set so as not to be aligned with each other in this embodiment, because color changes caused by changes in the superposed positions of toner are very noticeable when the screen angles are identical.

Returning to FIG. 2, a data process and method of selecting a dither matrix will be described. This description will consider a case in which image data expressing the image 40 is inputted into the printer driver 22.

When the target image 40 is configured of a plurality of objects 41-47 as shown in FIG. 2, the application transfers the image data expressing the image 40 to the printer driver 22 in units of objects. Here, an object may be considered a cohesive unit in the image 40 that is targeted for printing. Types of objects may include a photo or other image rendered in dots, lines, diagrams, and texts. The application transfers data of a form for rendering images to the printer driver 22 in units of objects through print commands (such as an image draw command, line draw command, diagram draw command, and text draw command). The print commands include any data required for drawing each object, such as the size, shape, coordinates, and colors.

The fixing problems affect image quality most noticeably in objects having areas of a prescribed size filled with a single color formed by a combination of the specific colors (e.g., objects described in diagram draw commands), as described above. For such objects, the printer driver 22 selects the fixing-problem-preventing dither matrix set 142 for use in the binarization process. However, since fixing problems are less noticeable in these types of images for colors not configured with toner combinations that produce such fixing problems or objects rendered by an image draw command or the like, it is preferable to emphasize moiré prevention over fixing problem prevention. Hence, the printer driver 22 selects the fixing-problem-preventing dither matrix set 142 for use in the binarization process for these objects.

Based on the details of the print commands assigned to each of the objects 41-47, the printer driver 22 can determine whether the object is an image or a non-image, such as a line, diagram, or text, and can determine the colors being drawn in non-images. The printer driver 22 selects the fixing-problem-preventing dither matrix set 142 when the object is a non-image and the non-image is not a single color that includes the specific color combinations.

Since most images employ a variety of colors rather than a single color filling an area of a prescribed size, the printer driver 22 uses the normal dither matrix set 141 to reduce the conspicuousness of fixing problems that occur when prescribed colors of toner are combined.

Using the example shown in FIG. 2, the printer driver 22 selects the fixing-problem-preventing dither matrix 142 as a to-be-used dither matrix set for the object 41 since the object 41 is an image. However, since the objects 42-44 and 47 are diagrams and the objects 45 and 46 are texts, the printer driver 22 selects either the normal dither matrix set 141 or the fixing-problem-preventing dither matrix set 142 as the to-be-used dither matrix set based on the combination of colors in the object.

For example, only cyan toner is used for gradations of cyan in which only the value of R varies as the values of G and B both remain at 255. In this case, the printer driver 22 selects the normal dither matrix set 141 as the to-be-used dither matrix set because fixing problems do not occur.

Similarly, only cyan toner is used for gradations of cyan in which only the value of G varies as the values of R and B both remain at 255. In this case, the printer driver 22 selects the normal dither matrix set 141 as the to-be-used dither matrix set because fixing problems do not occur.

On the other hand, red-based colors are formed by combining magenta toner with yellow toner. Since fixing problems may occur in this case, the printer driver 22 selects the fixing-problem-preventing dither matrix set 142 as the to-be-used dither matrix set.

Similarly, green-based colors are formed by combining cyan toner with yellow toner. Since fixing problems may occur in this case, the printer driver 22 selects the fixing-problem-preventing dither matrix set 142 as the to-be-used dither matrix set.

Blue-based colors are formed by combining magenta toner with cyan toner. Since fixing problems do not occur in this case, the printer driver 22 selects the normal dither matrix set 141 as the to-be-used dither matrix set. The printer driver 22 also selects the normal dither matrix set 141 for black as the to-be-used dither matrix set since fixing problems do not occur when forming images using only black toner.

Specifically, the printer driver 22 makes the following selections for objects 42-47 in the example of FIG. 2. The object 42 is a diagram having cyan or magenta gradations. Therefore, the printer driver 22 selects the normal dither matrix set 141 as the to-be-used dither matrix set for the object 41 because fixing problems will not occur.

The object 43 is a diagram filled by blue reproduced by superposing magenta toner on cyan toner. The printer driver 22 selects the normal dither matrix set 141 as the to-be-used dither matrix set for the object 43 because fixing problems will not occur.

The object 44 is a diagram filled by green reproduced by superposing cyan toner on yellow toner. The printer driver 22 selects the fixing-problem-preventing dither matrix set 141 as the to-be-used dither matrix set for the object 44 because fixing problems will occur.

The object 45 is text including characters in red reproduced by superposing magenta toner on yellow toner. The printer driver 22 selects the fixing-problem-preventing dither matrix set 142 as the to-be-used dither matrix set for the object 45 because fixing problems will occur.

The object 46 is text including characters in black. The printer driver 22 selects the normal dither matrix set 141 as the to-be-used dither matrix set for the object 45 because fixing problems will not occur when only black toner is used for reproducing black.

The object 47 is a diagram having a prescribed region filled by yellow. The printer driver 22 selects the normal dither matrix set 141 as the to-be-used dither matrix set for the object 47 because fixing problems will not occur.

Next, a binary image data creation process performed by the control unit 11 with the printer driver 22 will be described referring to FIG. 8. In S1 at the beginning of the binary image data creation process, the control unit 11 selects one object in the image to be printed as the process target and checks the details of the print command for this object.

In S2 the control unit 11 determines whether or not the print command assigned to the object is an image draw command. If the print command is an image draw command (S2: YES), in S3 the control unit 11 performs a rasterization process to draw the object (an image in this case), thereby rendering the object in RGB data having a possible 256 gradations per color.

In S4 the control unit 11 performs a color conversion process well known in the art to convert the RGB data drawn in S3 to CMYK data having 256 gradations per color. In S5 the control unit 11 selects the normal dither matrix set 141 as the dither matrix set to be used for binarization, and subsequently advances to S10. Hereinafter, the CYMK data will be referred to "object data". The object data expresses an object and has at least one set of pixel data.

However, if the control unit 11 determines in S2 that the print command assigned to the object is not an image draw command (S2: NO), in S6 the control unit 11 performs a rasterization process to draw the object (a line, diagram, or text in this case), thereby rendering the object in RGB data having 256 gradations per color.

In S7 the control unit 11 performs a color conversion process well known in the art to convert the RGB data drawn in S6 to CMYK data having 256 gradations per color. Hereinafter, the CYMK data will be referred to "object data". The object data expresses an object and has at least one set of pixel data.

In S8 the control unit 11 determines whether or not the object is drawn in a single color that includes at least one of a combination of yellow and cyan or a combination of yellow and magenta. That is, the control unit 11 determines whether or not the print command assigned to the object includes at least a command for drawing a single color produced by at least one of a combination of yellow and cyan and a combination of yellow and magenta. In other words, the control unit 11 determines the object is expressed in a single color produced by either one of a combination of yellow and cyan, a combination of yellow and magenta, and a combination of yellow, cyan, and magenta. This determination can also be made based on the color components in the RGB data rendered in the drawing process. The control unit 11 advances to S9 when determining that the print command includes a command to draw a single color produced by yellow and cyan, or yellow and magenta (S8: YES) and advances to S5 if the print command does not include such a drawing command (S8: NO).

In S9 the control unit 11 selects the fixing-problem-preventing dither matrix set 142 as the dither matrix set to be used for binarization and subsequently advances to S10. In S10 the control unit 11 performs a binarization process using the dither matrix set selected in either S5 or S9. In other words, the control unit 11 creates binary image using the fixing-problem-preventing dither matrix set 142 based on the at least one set of pixel data contained in the object data when the control unit 11 selects the fixing-problem-preventing dither matrix set 142. At this time, the binarization process will be performed using the fixing-problem-preventing dither matrix set 142 when the object is not an image object and the print command for the object includes a command to draw a single color including at least one of a combination of yellow and cyan and a combination of yellow and magenta.

In S11 the control unit 11 determines whether or not all steps of the above process including binarization have been completed for all objects. If the print commands for all objects have been processed (S11: YES), the control unit 11 ends the binary image data creation process. However, if there remain print commands to be processed (S11: NO), the control unit 11 returns to S1 and repeats the above process for a different object.

As described above, the personal computer 10 according to the above-described embodiment can prevent fixing problems that occur when combining particular colors of toner, such as when yellow toner is combined with at least one of cyan toner and magenta toner, even when it is necessary to superpose and fix such combinations of toner.

In other words, the control unit 11 selects the fixing-problem-preventing dither matrix set 142 (S9) when there are combinations of specific toner colors, namely yellow and either cyan or magenta. The fixing-problem-preventing dither matrix set 142 has four dither matrices with screen angles set to 90 degrees for yellow, 14 degrees for cyan (where the clockwise difference from the yellow screen angle is approximately equivalent to $(\pi/2 - \arctan(1/4))$ radians), and 166 degrees for magenta (where the clockwise difference from the yellow screen angle is approximately equivalent to $(\pi/2 + \arctan(1/4))$ radians). Each dither matrix of the fixing-problem-preventing dither matrix set 142 is a line screen type matrix having a plurality of 4×4 sub-matrices arranged therein. This means that dither matrices configured of a plurality of 4×4 sub-matrices arranged therein have screen angles for cyan and magenta set to two angles closest to but not aligned with the straight line orthogonal to the yellow screen angle.

Hence, by setting the screen angle for yellow to be as close as possible to a right angle to the cyan and magenta screen angles, the personal computer 10 can reduce the amount of areas in which these toner colors overlap, thereby reducing toner fixing problems, even when the yellow toner has a property that makes it difficult to fix with cyan and magenta toner. As a result, the personal computer 10 can prevent fixing problems that occur when combining specific colors of toner.

The personal computer 10 can also perform suitable image processing for objects in which fixing problems are particularly prevalent. That is, when an image is configured of a plurality of objects having multi-value image data, the control unit 11 treats each object in the image individually. The control unit 11 selects a suitable dither matrix set for each object from among the fixing-problem-preventing dither matrix set 142, which is configured to reduce areas of overlap between yellow and cyan and between yellow and magenta, and the normal dither matrix set 141, which is designed to prevent conventional moiré patterns. The control unit 11 selects the fixing-problem-preventing dither matrix set 142 (S2 and S8) when the object is not an image and is drawn in a single color that includes a combination of yellow with either cyan or magenta.

Therefore, since the fixing-problem-preventing dither matrix set 142 is selected for non-image objects having a single color configured of a specific color combination, the control unit 11 can perform suitable image processing on objects that are most likely to have fixing problems.

Further, the personal computer 10 uses the normal dither matrix set 141 for photos and other images in which fixing problems are unlikely to be noticeable in order to perform appropriate image processing for preventing moiré patterns.

While the invention has been described in detail with reference to the embodiments thereof, it would be apparent to those skilled in the art that various changes and modifications may be made therein without departing from the spirit of the invention.

Figure 9A:
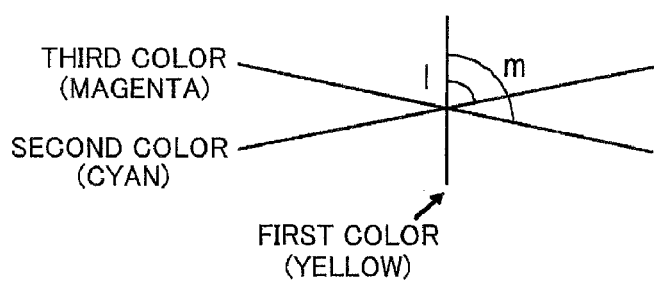
FIG. 9(a) is an explanatory diagram showing an example of single set of screen angles.

In the above-described embodiment, the screen angles of the fixing-problem-preventing dither matrix set 142 are set to 90 degrees (π/2 radians) for yellow, 14 degrees (approximately equivalent to arctan(¼) radians) for cyan (1 in FIG. 9(a)), 166 degrees (approximately equivalent to (π−arctan(¼)) radians) for magenta (m in FIG. 9(a)), and 45 degrees for black. When the screen angle for yellow is set to 90 degrees as shown in FIG. 9(a), the screen angle for cyan and the screen angle for magenta are set to angles closest to the straight line of 0 degrees (180 degrees) orthogonal to the yellow screen angle. In other words, the yellow screen angle is set to 90 degrees, and the difference between the yellow screen angle and the cyan and magenta screen angles is set to either one of (π/2−arctan(1/n)) radians and (π/2+arctan(1/n)) radians.

Figure 9B:
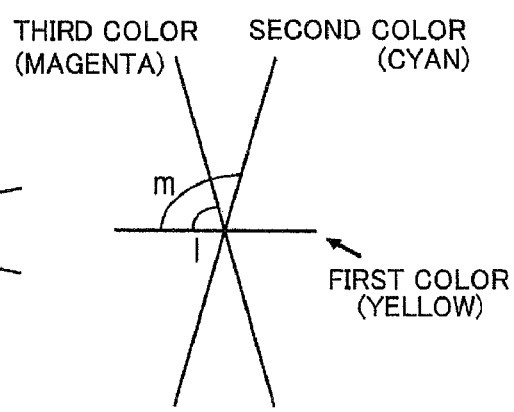
FIG. 9(b) is an explanatory diagram showing another example of single set of screen angles.

However, as shown in FIG. 9(b) the screen angle of the fixing-problem-preventing dither matrix set 142 may be set to 0 degrees for yellow, and the screen angles for cyan and magenta may be set to either one of (π/2−arctan(1/n)) radians (m in FIG. 9(b)) and (π/2+arctan(1/n)) radians (l in FIG. 9(b)). Specifically, when each dither matrix of the fixing-problem-preventing dither matrix set 142 for each color includes a plurality of 4×4 sub-matrices as shown in FIG. 9(b), the screen angles may be set to 0 degrees for yellow, 76 degrees (approximately equivalent to (π/2−arctan(¼)) radians) for cyan, and 104 degrees (approximately equivalent to (π/2+arctan(¼)) radians).

Further, if there were no restriction on being aligned with the straight line orthogonal to the yellow screen angle in this case, the screen angles for both cyan and magenta would be set to 0 degrees (180 degrees). However, since the precondition for the screen angles is to be closest to but not aligned with this straight line, the screen angles are set as close as possible to 0 degrees but not 0 degrees.

Further, in the above-described embodiment, each dither matrix of the fixing-problem-preventing dither matrix set 142 consists of a plurality of 4×4 sub-dither matrices, and the screen angles are set to 90 degrees for yellow, 14 degrees for cyan, and 166 degrees for magenta. However, each dither matrix of the fixing problem preventing dither matrix set 142 may consist of a plurality of 3×3 sub-dither matrices, and differences between the first screen angle and the second and third screen angles may also be set based on 3×3 sub-matrices. In this case, the screen angles may be set to any values, provided that the difference between the first screen angle and each of the second and third screen angles is either one of (π/2−arctan(⅓)) radians (about 71.6 degrees) and (π/2+arctan(⅓)) radians (about 108.4 degrees), where the first angle is the screen angle of a dither matrix corresponding to a first color (yellow) and the second and third angles are screen angles of dither matrices corresponding respectively to a second color (cyan) and a third color (magenta). In other words, the difference between the first screen angle and the second and third screen angles should be set to either one of 71 and 109 degrees.

Since most dither matrices are configured of sub-matrices having a size of at least 3×3, prevention of fixing problems becomes effective within a range of arctan(⅓) radians on either side of 90 degrees, when accounting for the minimum angle required to prevent moiré patterns.

Further, while each dither matrix in the above-described embodiment is defined based on 4×4 sub-matrices, the present invention may be applied to dither matrices having 5×5 or larger sub-matrices. Also, the shape of sub-matrices constituting a line screen type matrix is not restricted.

As in the above-described embodiment, the screen angles of the fixing-problem-preventing dither matrix set 142 are set so that the first screen angle approaches a right angle to the second and third screen angles. Assuming the first color of toner has a property that makes it difficult to fix with other specific colors of toner, this configuration can reduce the amount of areas in which the first color of toner is superposed with the second and third colors of toner, thereby reducing toner fixing problems.

The description of the above-described embodiment assumes that yellow is the base toner layer and that fixing problems occur when yellow is combined with cyan or magenta. However, the color combinations may differ depending on which combinations of toner cause fixing problems.

Further, while the above-described embodiment describes a printer using the four colors C, M, Y, and K, the present invention is not limited to these four colors and may be applied to a printer printing in other colors or a printer using five or more colors.

What is claimed is:

1. An image processing device comprising:
   a storing unit that stores a single set of line dither matrices, the single set of line dither matrices including a first line dither matrix for first color, a second line dither matrix for second color, and a third line dither matrix for third color, each of the first line dither matrix, the second line dither matrix, and the third line dither matrix including threshold values that are arranged to make halftone dots grow linearly and including a plurality of n×n sub-matrices, n being set to an integer greater than 1, the first dither matrix having a first screen angle, the second dither matrix having a second screen angle that is different from the first screen angle, the third dither matrix having a third screen angle that is different from the first screen angle and the second screen angle; and
   a controller configured to operate as:
   a creating unit that is configured to create binary image data based on input image data using the single set of line dither matrices,
   wherein a difference between the first screen angle and the second screen angle is set to either one of (π/2−arctan(1/n)) radians and (π/2+arctan(1/n)) radians, and
   wherein a difference between the first screen angle and the third screen angle is set to either one of (π/2−arctan(1/n)) radians and (π/2+arctan(1/n)) radians.

2. The image processing device according to claim 1, wherein n is set to 3.

3. The image processing device according to claim 1, wherein the storing unit further stores at least one set of non-line dither matrices different from the single set of line dither matrices;
   wherein the controller is further configured to operate as:
   a print data acquiring unit that is configured to acquire print data including at least one set of object data, each set of object data expressing an object and having at least one set of input image data;
   a first determining unit that is configured to determine, for each object, whether or not the object is an image object;
   a second determining unit that is configured to determine, when the first determining unit determines that one object is different from an image object, whether or not the one object is expressed in a single color produced by either one of a combination of the first color and the second color, a combination of the first color and the third color, and a combination of the first color, the second color, and the third color; and
   a selecting unit that is configured to select the single set of line dither matrices for the one object when the second determining unit determines that the one object is expressed in a single color produced by either one of a combination of the first color and the second color, a combination of the first color and the third color, and a combination of the first color and the second color and the third color, and wherein the creating unit creates the binary image data using the single set of line dither matrices based on the at least one set of input image data contained in the object data expressing the one object when the selecting unit selects the single set of line dither matrices for the one object.

4. The image processing device according to claim 3, wherein the selecting unit is further configured to select the set of non-line dither matrices for the one object when the second determining unit determines that the subject object is not expressed in a single color produced by either one of a combination of the first color and the second color, a combination of the first color and the third color, and a combination of the first color and the second color and the third color, and wherein the creating unit creates the binary image data using the single set of non-line dither matrices based on the at least one set of input image data contained in the object data expressing the one object when the selecting unit selects the single set of non-line dither matrices for the one object.

5. The image processing device according to claim 3, wherein a first image to be formed based on one set of input image data using the single set of line dither matrices has a first superposed area in which at least one of the second color and the third color is superposed on the first color, and wherein a second image to be formed based on the one set of input image data using the single set of non-line dither matrices has a second superposed area in which at least one of the second color and the third color is superposed on the first color, the first superposed area being smaller than or equal to the second superposed area.

6. An image processing method comprising:
acquiring input image data; and
creating binary image data based on the input image data using a single set of line dither matrices, the single set of line dither matrices including a first line dither matrix for first color, a second line dither matrix for second color, and a third line dither matrix for third color, each of the first line dither matrix, the second line dither matrix, and the third line dither matrix including threshold values that are arranged to make halftone dots grow linearly and including a plurality of n×n sub-matrices, n being set to an integer greater than 1, the first dither matrix having a first screen angle, the second dither matrix having a second screen angle that is different from the first screen angle, the third dither matrix having a third screen angle that is different from the first screen angle and the second screen angle, a difference between the first screen angle and the second screen angle being set to either one of $(\pi/2-\arctan(1/n))$ radians and $(\pi/2+\arctan(1/n))$ radians, a difference between the first screen angle and the third screen angle being set to either one of $(n/2-\arctan(1/n))$ radians and $(\pi/2+\arctan(1/n))$ radians;

wherein the method is executed by at least one image processor.

7. A non-transitory computer-readable recording medium that stores an image processing program, the image processing program comprising instructions for:
acquiring input image data; and
creating binary image data based on the input image data using a single set of line dither matrices, the single set of line dither matrices including a first line dither matrix for first color, a second line dither matrix for second color, and a third line dither matrix for third color, each of the first line dither matrix, the second line dither matrix, and the third line dither matrix including threshold values that are arranged to make halftone dots grow linearly and including a plurality of n×n sub-matrices, n being set to an integer greater than 1, the first dither matrix having a first screen angle, the second dither matrix having a second screen angle that is different from the first screen angle, the third dither matrix having a third screen angle that is different from the first screen angle and the second screen angle, a difference between the first screen angle and the second screen angle being set to either one of $(\pi/2-\arctan(1/n))$ radians and $(\pi/2+\arctan(1/n))$ radians, a difference between the first screen angle and the third screen angle being set to either one of $(\pi/2-\arctan(1/n))$ radians and $(\pi/2+\arctan(1/n))$ radians.

* * * * *